(12) United States Patent
Trajkovic et al.

(10) Patent No.: US 10,657,666 B2
(45) Date of Patent: May 19, 2020

(54) SYSTEMS AND METHODS FOR DETERMINING COMMERCIAL TRAILER FULLNESS

(71) Applicant: SYMBOL TECHNOLOGIES, LLC, Lincolnshire, IL (US)

(72) Inventors: Miroslav Trajkovic, Setauket, NY (US); Justin F. Barish, Kings Park, NY (US); Adithya H. Krishnamurthy, Hicksville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/853,293

(22) Filed: Dec. 22, 2017

(65) Prior Publication Data

US 2019/0197716 A1 Jun. 27, 2019

(51) Int. Cl.
| | |
|---|---|
| G06T 7/50 | (2017.01) |
| G06T 7/593 | (2017.01) |
| G06F 3/048 | (2013.01) |
| G06Q 10/08 | (2012.01) |
| G06Q 10/04 | (2012.01) |
| H04N 13/128 | (2018.01) |
| G06K 9/00 | (2006.01) |

(52) U.S. Cl.
CPC .............. *G06T 7/593* (2017.01); *G06F 3/048* (2013.01); *G06K 9/00832* (2013.01); *G06Q 10/04* (2013.01); *G06Q 10/08* (2013.01); *H04N 13/128* (2018.05)

(58) Field of Classification Search
CPC ...... G06T 7/593; H04N 13/128; G06Q 10/04; G06Q 10/08; G06F 3/048

USPC ......................................................... 382/154
See application file for complete search history.

(56) References Cited

U.S. PATENT DOCUMENTS

| 9,460,524 B1 | 10/2016 | Curlander et al. | |
|---|---|---|---|
| 2005/0270286 A1* | 12/2005 | Hirvonen | G06K 9/00214 345/422 |
| 2006/0202809 A1* | 9/2006 | Lane | G06Q 10/08 340/438 |
| 2009/0044505 A1* | 2/2009 | Huster | A01D 43/087 56/10.2 R |

(Continued)

FOREIGN PATENT DOCUMENTS

| CN | 105825495 | * | 8/2016 | ............. G06T 7/593 |
|---|---|---|---|---|
| JP | 2016136321 | * | 7/2016 | ............... G06T 7/00 |

OTHER PUBLICATIONS

International Search Report and Written Opinion for International Application No. PCT/US2018/061040 dated Jan. 25, 2019.

*Primary Examiner* — Jerome Grant, II
(74) *Attorney, Agent, or Firm* — Yuri Astvatsaturov

(57) ABSTRACT

A three-dimensional (3D) depth imaging system is provided for use in commercial trailer loading applications. A 3D-depth camera may be configured and oriented to capture 3D image data of a vehicle storage area. A depth-detection application executing on one or more processors may determine, based on the 3D image data, at least a wall data region and a non-wall data region. Based on the determination of the wall data and the non-wall data region, the depth-detection application generates a wall indicator that indicates a wall is situated at a discrete depth within the vehicle storage area.

22 Claims, 11 Drawing Sheets

(56) References Cited

U.S. PATENT DOCUMENTS

| | | | |
|---|---|---|---|
| 2009/0319165 A1* | 12/2009 | Eadie | B64D 9/00 |
| | | | 701/124 |
| 2013/0342653 A1 | 12/2013 | McCloskey et al. | |
| 2014/0333726 A1 | 11/2014 | Tokui et al. | |
| 2014/0372182 A1 | 12/2014 | Groble et al. | |
| 2015/0249821 A1* | 9/2015 | Tanizumi | B60R 1/00 |
| | | | 348/46 |
| 2016/0223471 A1* | 8/2016 | Akashi | G01N 21/954 |
| 2016/0239799 A1 | 8/2016 | Burch, V et al. | |
| 2016/0297361 A1* | 10/2016 | Drazan | H04N 7/181 |
| 2017/0178333 A1 | 6/2017 | Zhang et al. | |
| 2017/0336195 A1* | 11/2017 | Suzuki | G01B 11/022 |
| 2018/0157455 A1* | 6/2018 | Troy | G06F 3/147 |
| 2018/0290844 A1* | 10/2018 | Lewis | G06Q 10/083 |
| 2018/0293743 A1* | 10/2018 | Iida | G06T 7/0008 |
| 2018/0354720 A1* | 12/2018 | Nakano | B65G 59/02 |

* cited by examiner

SYSTEMS AND METHODS FOR DETERMINING COMMERCIAL TRAILER FULLNESS

FIELD OF THE DISCLOSURE

The present disclosure generally relates to commercial vehicles and, more particularly, to systems and methods for determining fullness of commercial vehicles.

BACKGROUND

Three-dimensional (3D) cameras may be used to determine distances from the camera to objects positioned in the vicinity of the camera. These 3D cameras can be used to determine a fullness of a commercial vessel or trailer, as even slight increases in fullness can lead to considerable savings in transportation costs. Such fullness determinations can be difficult due to object interference or disturbances that can adversely impact calculations. For example, in situations requiring the sensing of surface areas within a large storage area, such as a storage area of a commercial trailer, the storage area may include moving objects, such as people, packages being moved, loading vehicles, etc., that may cause the 3D camera to produce inaccurate data regarding the size or dimensions of the storage area. Such inaccurate data can be especially problematic for end-use applications that rely on the data to perform calculations or other data manipulations for facilitating depth or other 3D determinations, and may provide an inaccurate fullness measurement which may adversely impact loading efficiency. Additionally, object interferences can increase system processing times required to assess trailer fullness which in turn may further increase load times and their associated costs.

Accordingly, there is a need for depth imaging systems and methods for use in commercial trailer loading.

SUMMARY

In accordance with one aspect, a three-dimensional (3D) depth imaging system is provided for use in commercial trailer loading applications. A 3D-depth camera may be configured and oriented to capture 3D image data of a vehicle storage area. A depth-detection application executing on one or more processors may determine, based on the 3D image data, at least a wall data region and a non-wall data region. Based on the determination of the wall data and the non-wall data region, the depth-detection application generates a wall indicator that indicates a wall is situated at a discrete depth within the vehicle storage area.

In some examples, a 3D depth imaging method for use in commercial trailer loading includes capturing, via a 3D-depth camera, 3D image data of a vehicle storage area. The 3D-depth camera is oriented in a direction to capture the 3D image data of the vehicle storage area. The method further includes analyzing, via one or more processors, the 3D image data with a depth-detection application. The depth-detection application determines, based on the 3D image data, at least a wall data region and a non-wall data region. The method generates, via the depth-detection application, a wall indicator that indicates that a wall situated at a discrete depth within the vehicle storage area is detected.

BRIEF DESCRIPTION OF THE DRAWINGS

The above needs are at least partially met through provision of the systems and methods for determining commercial trailer fullness described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Systems and methods are disclosed herein that allow for accurately determining fill percentages of commercial trailers. These systems and methods use 3D cameras to determine a "fill distance," or a "wall" of packages closest to the trailer entrance. By calculating a histogram of depth measurements for the trailer and making necessary corrections, the described systems and methods may accurately account for interference while being capable of quickly calculating actual trailer fill percentages. The disclosed techniques allow for more accurate reporting and display of vehicle capacity and fullness data, and, thereby, reduce false positives, or other inaccurate data and reporting, e.g., in graphical representations of a vehicle storage area, as implemented by loading applications described herein.

Accordingly, in various embodiments disclosed herein, three-dimensional (3D) depth imaging systems for use in commercial trailer loading are described. For example, a 3D-depth camera may be configured and oriented to capture 3D image data of a vehicle storage area. A depth-detection application executing on one or more processors may determine, based on the 3D image data, at least a wall data region and a non-wall data region. Based on the determination of the wall data and the non-wall data region, the depth-detection application generates a wall indicator that indicates a wall is situated at a discrete depth within the vehicle storage area.

Figure 1:
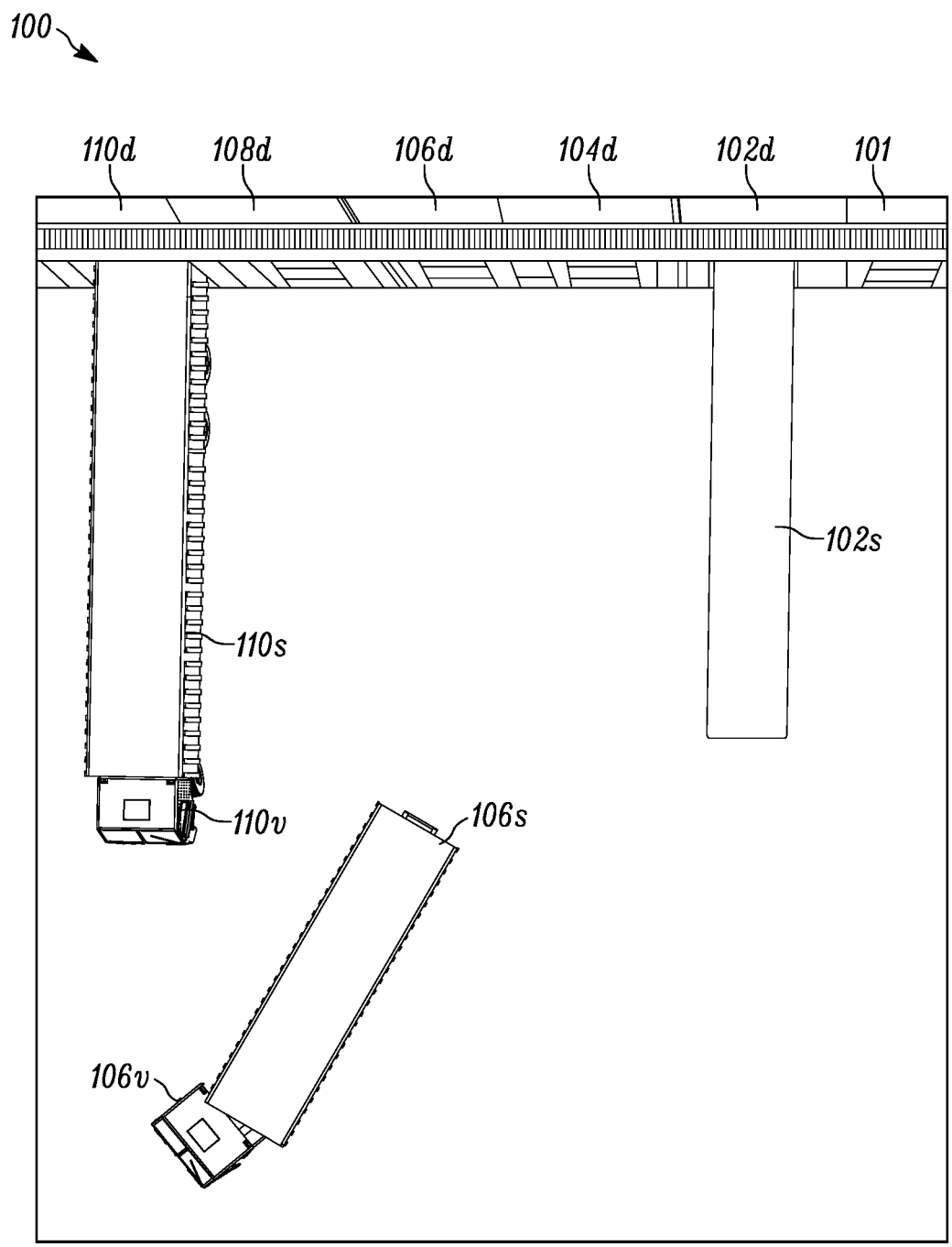
FIG. 1 is a perspective view, as seen from above, of a loading dock including a loading facility, a plurality of docking bays, a plurality of vehicles, and a plurality of vehicle storage areas, in accordance with example embodiments herein.

FIG. 1 is a perspective view, as seen from above, of a loading dock 100 including a loading facility 101, a plurality of docking bays 102d-110d, a plurality of vehicles 106v and 110v, and a plurality of vehicle storage areas 102s-110s, in accordance with example embodiments herein. In some embodiments, loading dock 100 may, for example, be associated with a retail store, a wholesale store, or other such commercial building. In other embodiments loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example, FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may further include padding or insulation to receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, with the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

As described herein, each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage areas 102s interfaces with the opening of docking bay 102d such that the interior of vehicle storage areas 102s may be viewed or accessed from docking bay 102d. Similarly, vehicle storage area 110s is also depicted as a trailer that is docked with docking bay 110d, where the opening of vehicle storage areas 110s interfaces with the opening of docking bay 110d such that the interior of vehicle storage areas 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or other dimensions. For example, in one embodiment, the vehicle storage area 102s may be associated with a 63-foot-long trailer, vehicle storage area may be associated with a 53 foot long trailer, and vehicle storage area 110s may be associated with a 73 foot long trailer. Other variations of vehicle storage area dimensions, sizes, and/or lengths are contemplated herein.

Figure 2A:
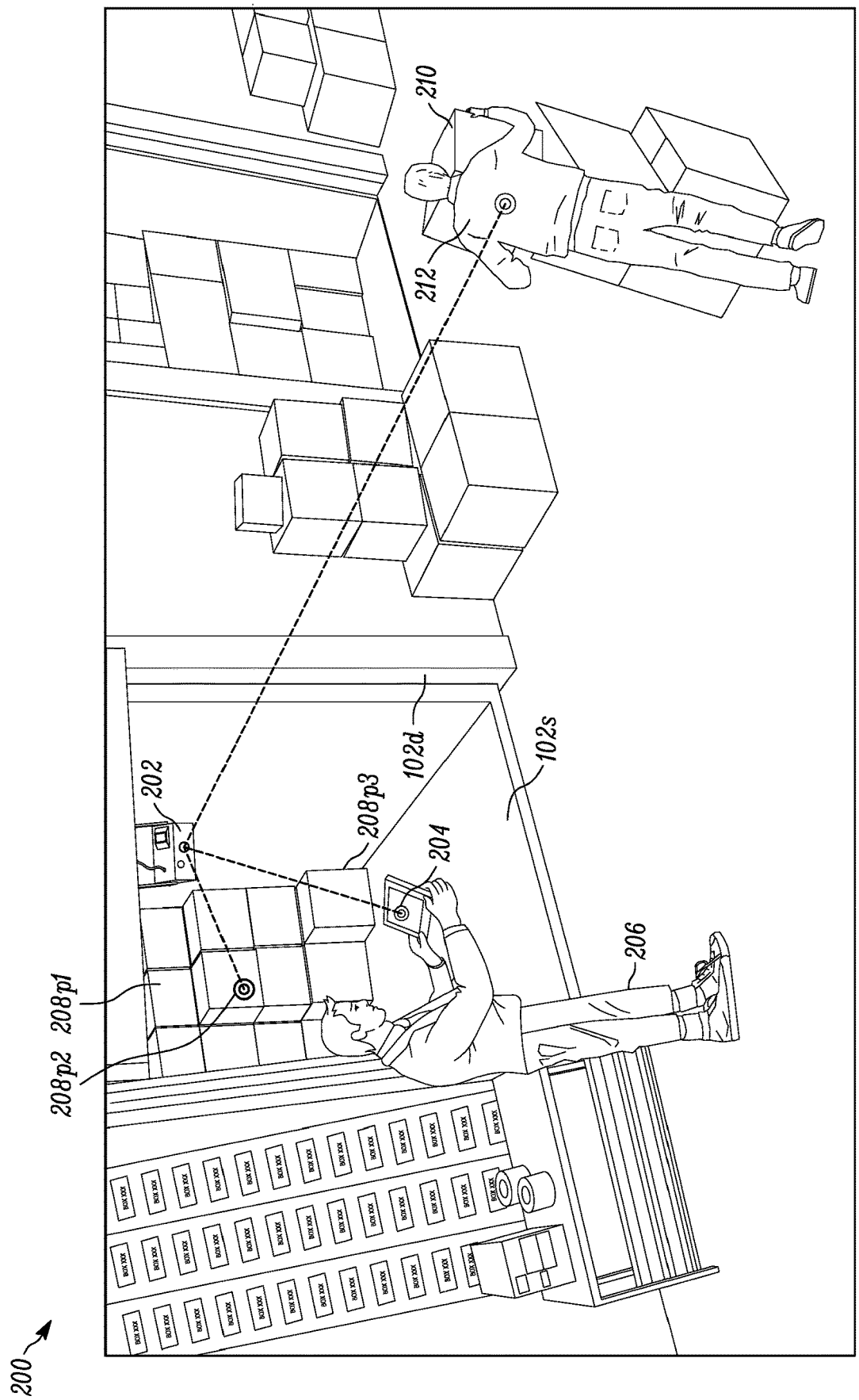
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG. 2A is an interior view of the docking bay 102d of FIG. 1. As depicted in FIG. 2A, vehicle storage area 102s is docked with docking bay 102d exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data) and a photo-realistic camera (e.g., 2D image data). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102*s* to capture 3D and/or 2D image data of the interior of vehicle storage area 102*s*. For example, as shown in FIG. 2A, TMU 202 may be oriented such that the 3D and 2D cameras of TMU 202 look down the length of the vehicle storage area 102*s* so that TMU 202 may scan or sense the walls, floor, ceiling, packages (e.g., 208*p*1-208*p*3 or 210), or other objects or surfaces with vehicle storage area 102*s* to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 202 may process the 3D and 2D image data, as scanned or sensed from the 3D-depth camera and photo-realistic camera, for use by other devices (e.g., client device 204 or server 301, as further described herein). For example, the one or more processors and/or one or more memories of the TMU 202 may process the image data scanned or sensed from vehicle storage area 102*s*. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208*p*1-208*p*3 or 210), as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or server may generate post-scanning data, that may include metadata, simplified data, normalized data, result data, status data, or alert data as determined from the original scanned or sensed image data provided by the TMU 202. As described herein, the server or centralized may store such data, and may also send the image data and/or the post-scanning data to a dashboard app, or other app, implemented on client device, such as the dashboard app implemented on client device 204 of FIG. 2A.

Figure 2B:
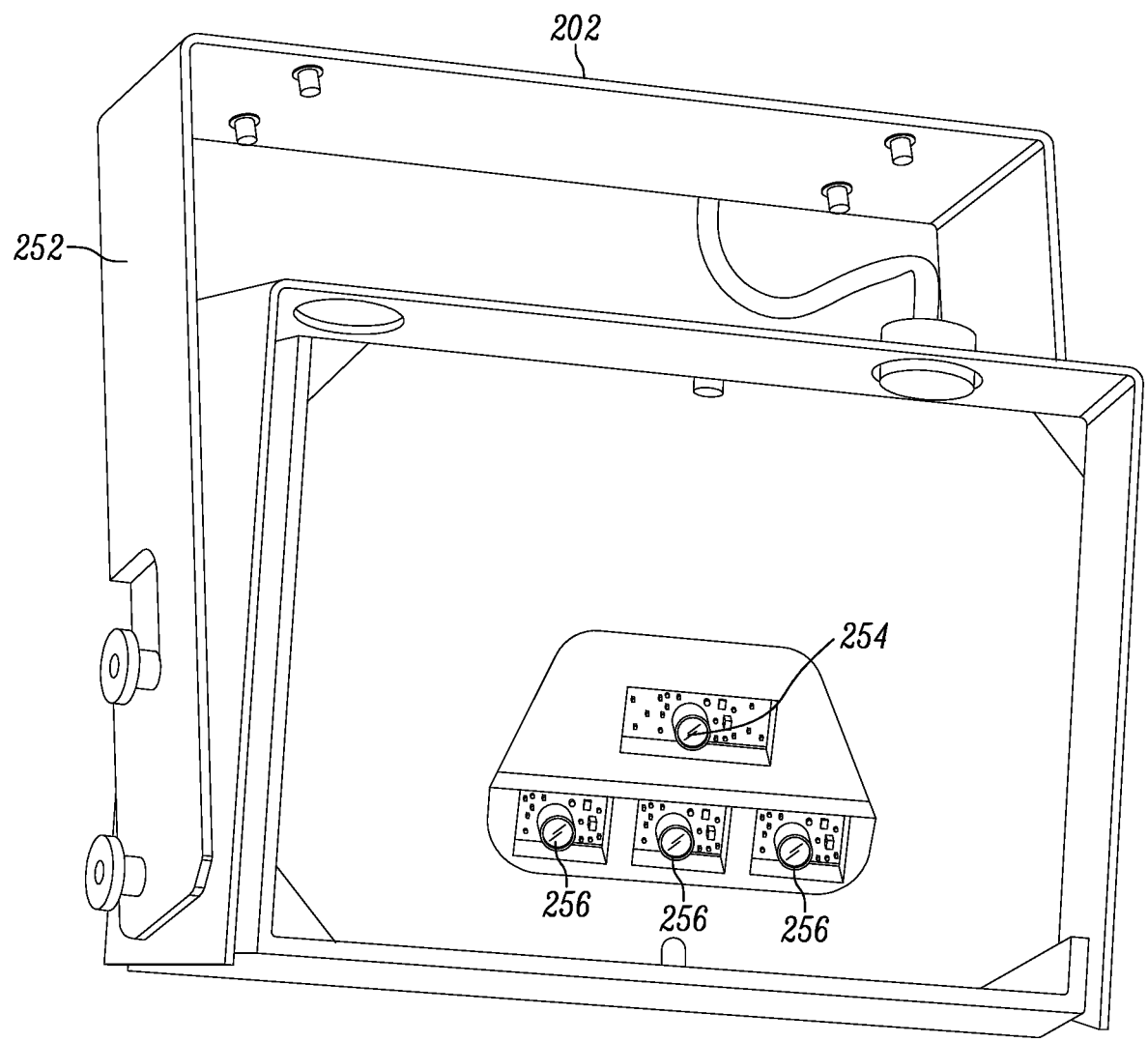
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data and/or post-scanning data. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

TMU 202 may include a 3D-depth camera 254 for capturing, sensing, or scanning 3D image data. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102*s*) or objects within the vehicle storage area, such as boxes or packages (e.g., packages 208*p*1-208*p*3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102*s*. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102*s* and any objects or surfaces therein.

The TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
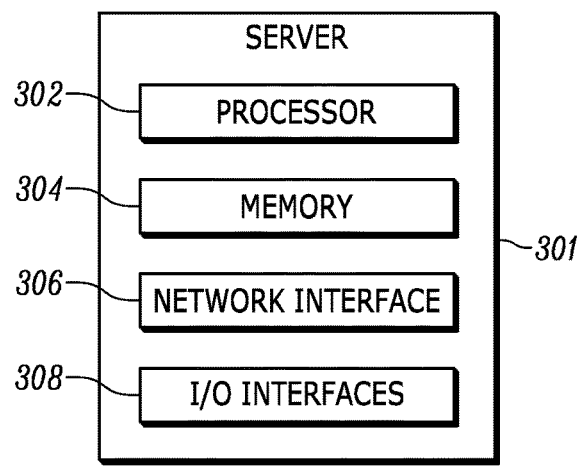
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In ether embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4A:
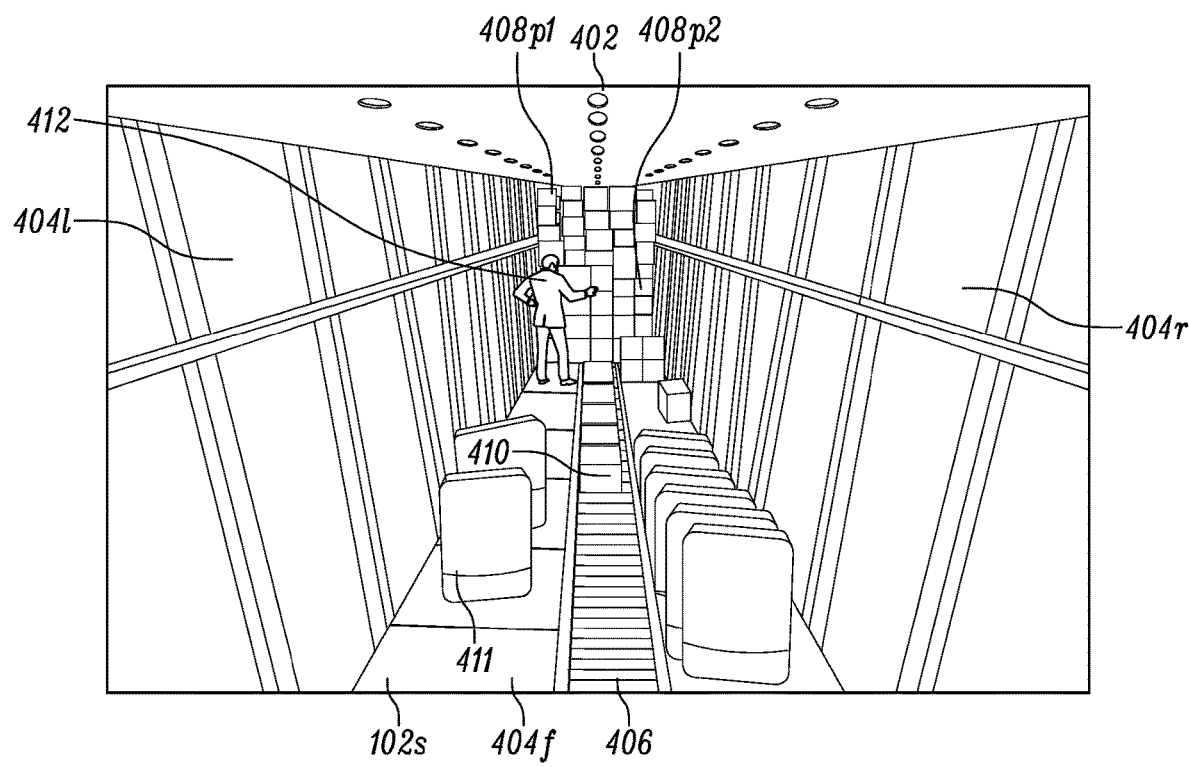
FIG. 4A is a photo-realistic view depicting a first embodiment of the vehicle storage area docked at the docking bay of FIG. 2A where the storage area includes a package wall.

FIG. 4A is a photo-realistic view 402 depicting a first embodiment of the vehicle storage area 102s docked at the docking bay 102d of FIG. 2A where the storage area includes an in-range package wall (e.g., package wall 408p1 or package wall 408p2 as described herein). Photo-realistic view 402 may be a 2D image as captured, for example, by photo-realistic camera 256 of TMU 202. Photo-realistic view 402 may include 2D image data, such as pixel data or RGB data as described herein.

Photo-realistic view 402 depicts package walls 408p1 and 408p2. As used herein, a package wall may be a stack of packages, boxes, or other transportable objects or goods typically involved in distribution and logistics. A package wall may also be a single package that forms the foundation of a new package wall. Each of the packages, boxes, or other transportable objects or goods that make up a particular package wall may share a common depth, length, or other dimension such that the particular package wall, as a whole, contains at least one uniform or approximately uniform depth, length, or dimension. As depicted in photo-realistic view 402, package walls 408p1 and 408p2 are located at the rear section of the vehicle storage area 102s, and are in-range of the 3D-depth camera (e.g., 3D-depth camera 254) as described herein. In some embodiments, package walls 408p1 and 408p2 may correspond to any of the packages or package walls 208p1-208p3 of FIG. 2a as described herein.

As further depicted in photo-realistic view 402, vehicle storage area 102s is defined by surface areas including left wall 404l, right wall 404r, and floor area 404f. The surface areas, including left wall 404l, right wall 404r, and floor area 404f, are generally rigid, or semi-rigid, surface areas that together form the interior space of vehicle storage area 102s.

Photo-realistic view 402 additionally depicts loading conveyer 406. Loading conveyer 406 may be used to load or unload packages from vehicle storage area 102s to loading facility 101 through docking bay 102s, and vice versa. For example, packages 410 and 411 may be loaded or unloaded from vehicle storage area 102s to loading facility 101 through docking bay 102d. Photo-realistic view 402 also depicts additional items that may be contained in the vehicle storage area 102s as well as a worker 412 who may facilitate the loading or unloading of the packages 410, including packages of either of the package walls 408p1 and 408p2. In some embodiments, worker 412 may correspond to worker 212 of FIG. 2a as described herein.

Figure 4B:
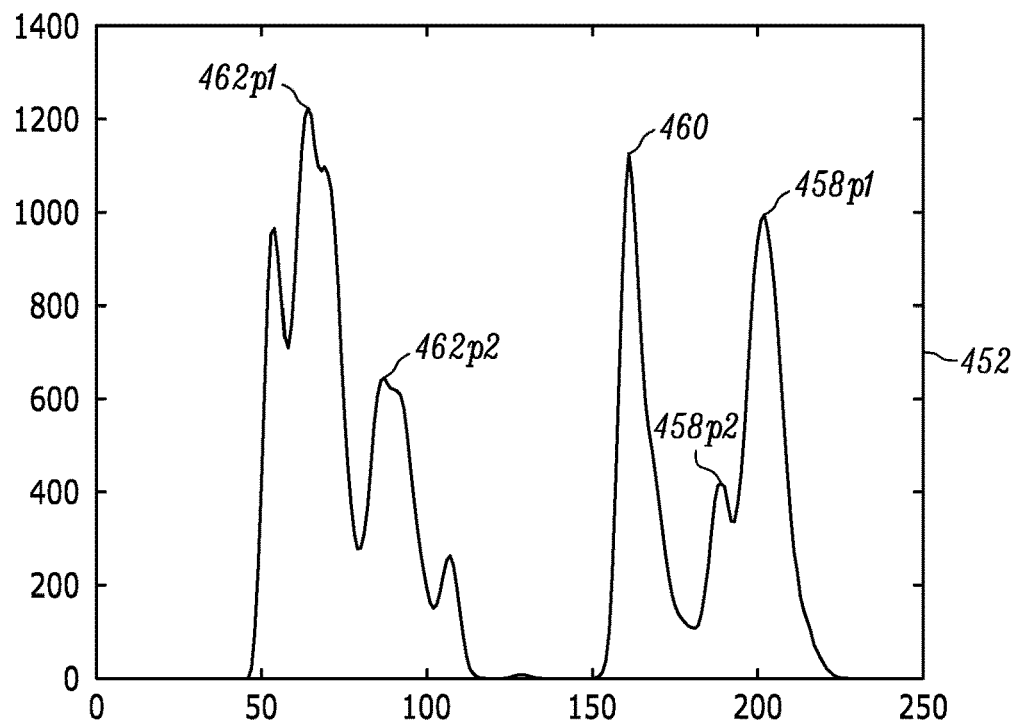
FIG. 4B is a histogram rendering of the photo-realistic view of FIG. 4A that includes a detected package wall.

FIG. 4B is a histogram 452 of depth data corresponding to the photo-realistic view of FIG. 4A that includes a detected package wall and other objects located in the field of view of the 3D-depth camera (e.g., 3D-depth camera 254). The histogram 452 represents a 3D image, and 3D image data, of the vehicle storage area 102s docked at the docking bay 102d of FIG. 2A where the storage area includes a detected package wall (e.g., package wall 458p1 and/or 458p2). In essence, the depth data are analyzed via heuristics to detect dominant peaks, thereby determining wall locations based on peaks depicted in the histogram 452. Trailer fullness calculations are determined by averaging the histogram 452 from a current wall (that is, a wall positioned closest to the opening of the vehicle storage area 102s to which packages are being added thereto) to the end of the trailer. The systems and methods described herein use the histogram 452 of the row data (as opposed to coagulated data points). The weight of each 3D point is dependent on its distance from the 3D-depth camera (e.g., 3D-depth camera 254), as will be described herein.

The histogram 452 includes clusters that correspond to objects located at various depths within the trailer. For example, histogram 452 includes package wall peaks 458p1 and 458p2 that correspond to package walls 408p1 and 408p2. Histogram 452 also depicts a worker peak 460 that corresponds to worker 412 of the photo-realistic view 402 and staging package peaks 462p1, 460p2 corresponding to packages 410 and 411, respectively.

Figure 4C:
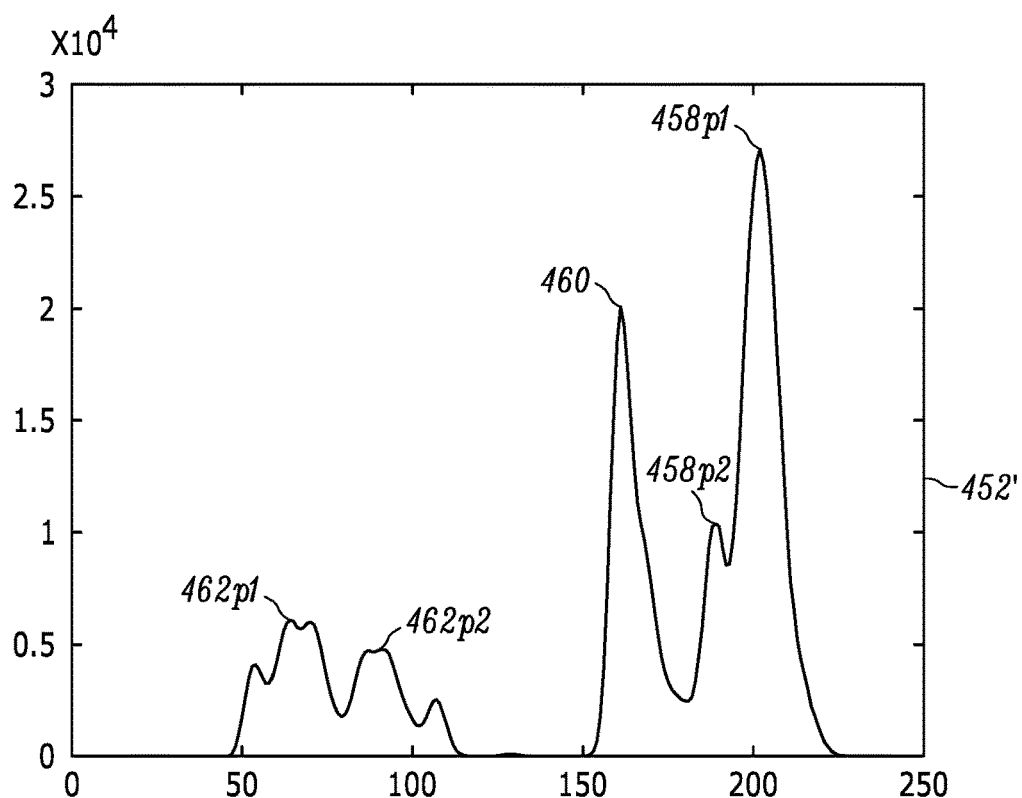
FIG. 4C is a histogram rendering of the photo-realistic view of FIG. 4A that is scaled or weighted to correct for objects being positioned near the TMU.

Turning to FIGS. 4B and 4C, in some instances, portions of the storage area 102s positioned near the 3D-depth camera 254 may occupy a larger area in the field of view of the 3D-depth camera 254 compared to their actual size, and thus may create higher peaks in the histogram 452. For example, peaks 462p1 and 462p2 appear to be relatively large in size in histogram 452. By weighing or scaling each distance in the histogram 452 with a value that is proportional to its distance from the 3D-depth camera 254, peaks may be appropriately scaled to account for distance variances. Accordingly, as illustrated in FIG. 4C, which depicts a scaled histogram 452' of depth data also corresponding to the photo-realistic view of FIG. 4A, peaks 462p1 and 462p2 have a smaller maximum value when compared to the remaining peaks (e.g., 458p1).

Figure 5A:
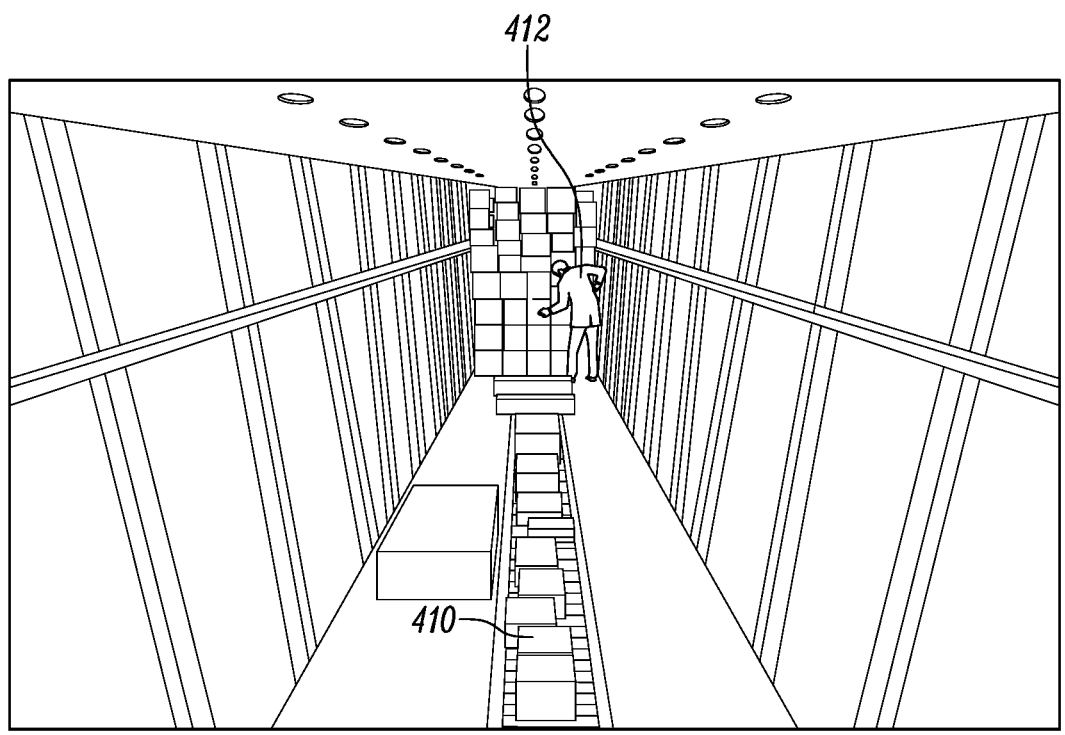
FIGS. 5A-5C are historical photo-realistic views depicting a second embodiment of the vehicle storage area docked at the docking bay of FIG. 2A where the storage area includes a package wall and a loader positioned at various locations within the vehicle storage area.
Figure 5B:
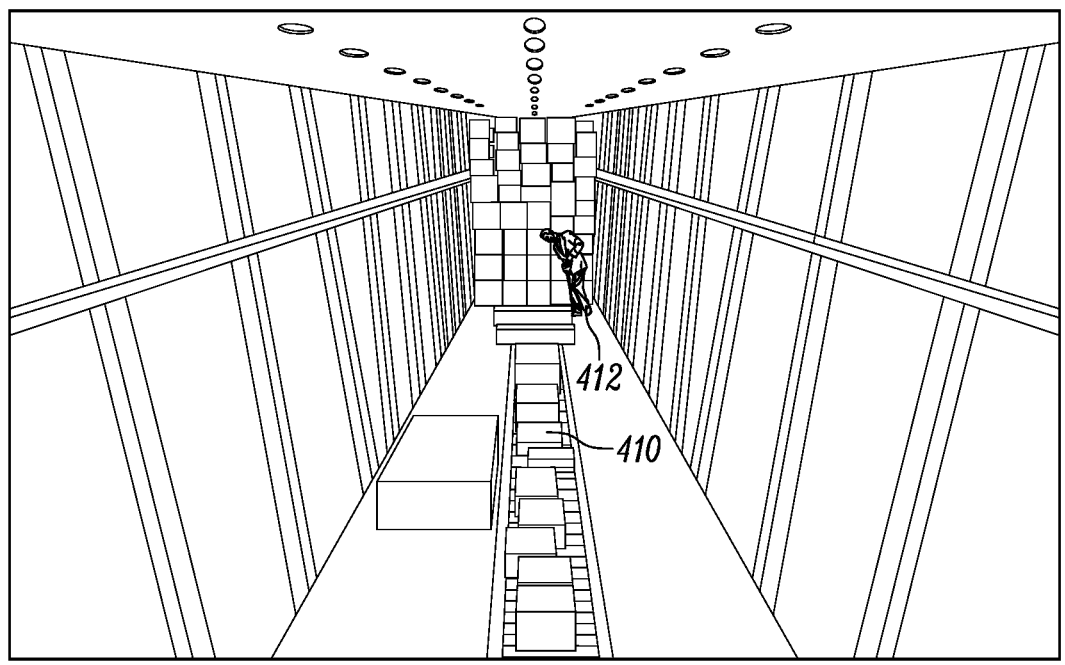
Figure 5C:
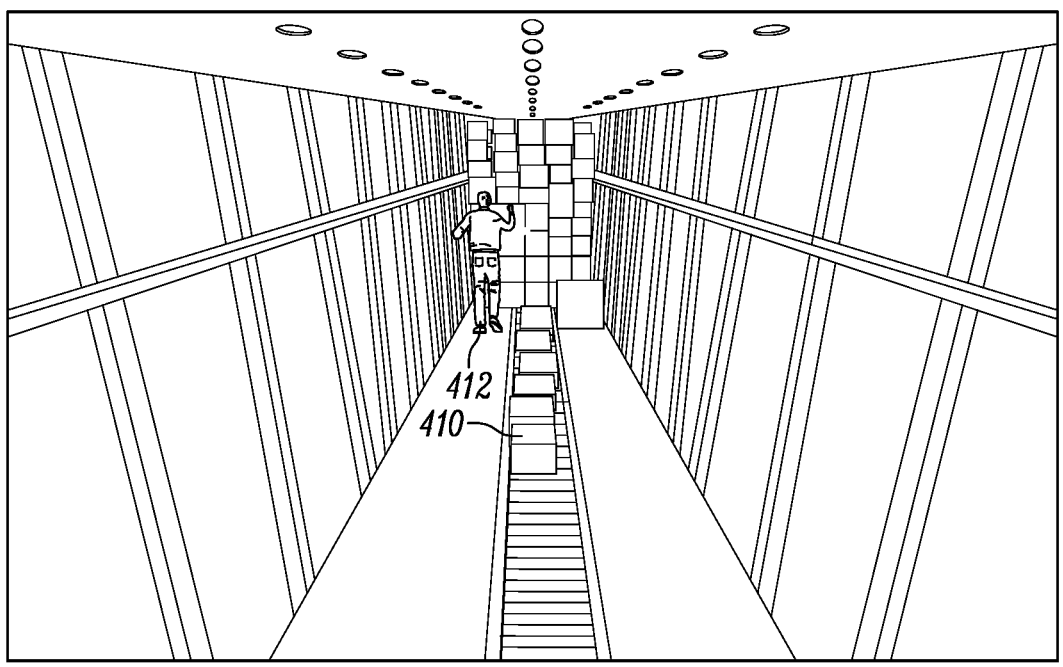
Figure 5D:
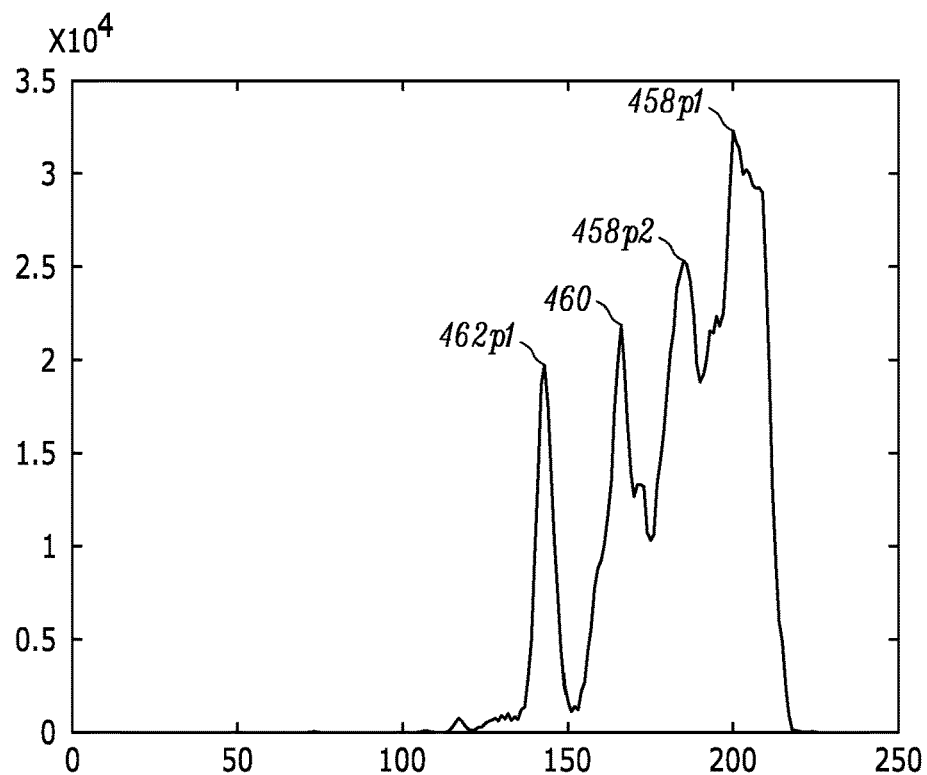
FIGS. 5D-5F are histogram renderings of the historical photo realistic views of FIGS. 5A-5C, respectively.
Figure 5E:
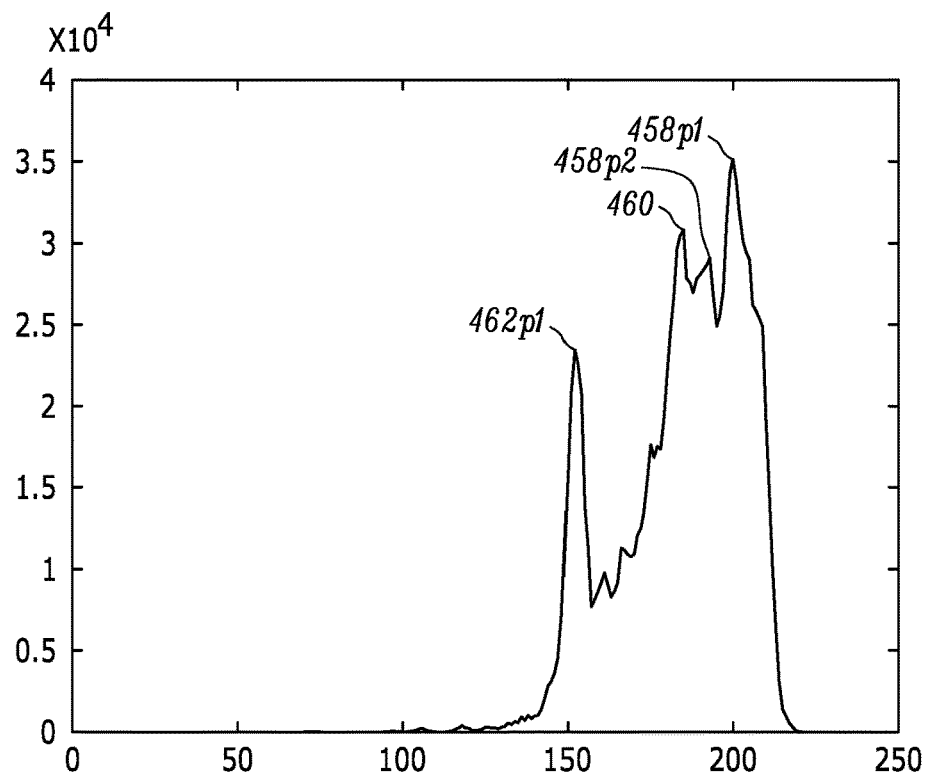
Figure 5F:
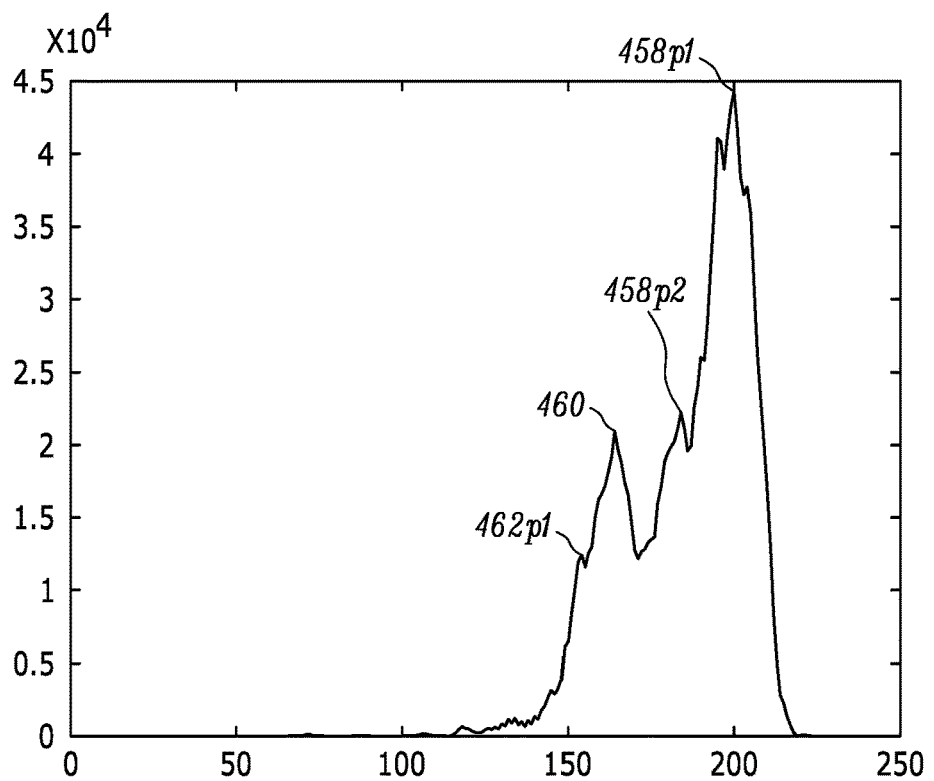

Turning to FIGS. 5A-5G, in some instances, portions of the storage area 102s may be temporarily occupied. For example, as illustrated in FIGS. 5A-5C, illustrating historical photo-realistic views of the storage area 102s captured over a period of time, the storage area 102s may be occupied by the loader 412 and any number of packages 410 which may move throughout the storage area 102s. As illustrated in FIGS. 5D-5F, which represent histogram renderings of the views illustrated in FIGS. 5A-5C, respectively, the magnitude of peaks 458p1 and 458p2, corresponding to package walls 408p1 and 408p2, remains relatively stationary over the time period depicted in FIGS. 5A-5C. However, the magnitude and location of peaks 460 and 462p1, corresponding to the loader 412 and any number of packages 410, varies over time due to movement of the loader and the loader's formation of new package walls.

A number of approaches may be used to account for these types of non-wall moving objects. In a first approach, data in successive images may be subtracted as a way to detect corresponding moving objects and to remove them to calculate a histogram of only the stationary objects (i.e., package walls). In another approach, data in historical histograms can be added together, thereby amplifying peaks corresponding to stationary objects (i.e., package walls) as compared to peaks corresponding to moving objects. In any of these or other approaches, data captured in a number of successive frames (e.g., 2-5 frames captured approximately every 15 seconds, every 30 seconds, every minute, etc.) may be used.

Figure 5G:
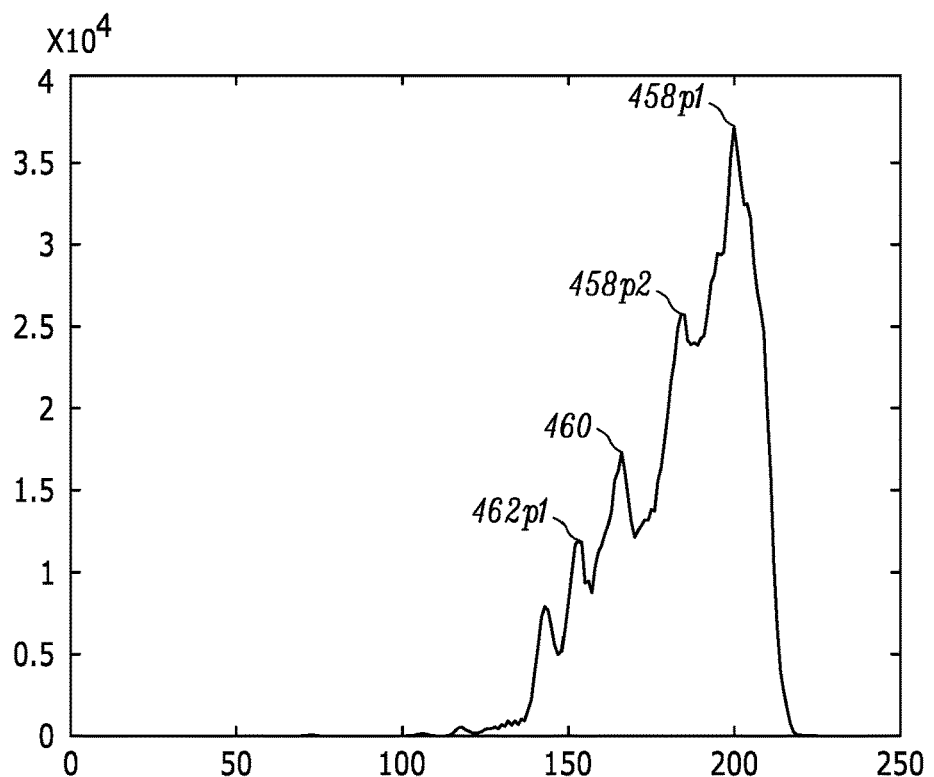
FIG. 5G is a modified histogram rendering of FIGS. 5D-5F wherein data representing the loader and packages in temporary locations are minimized.

In the example of FIG. 5G, which illustrates a modified histogram rendering of the histograms illustrated in FIGS. 5D-5F, the package wall is readily identifiable due to its corresponding peak being substantially larger and further than other captured peaks. However, in some examples, maximum peak heights may be more closely grouped, and thus may require additional calculations to accurately identify a dominant package wall.

Figure 6:
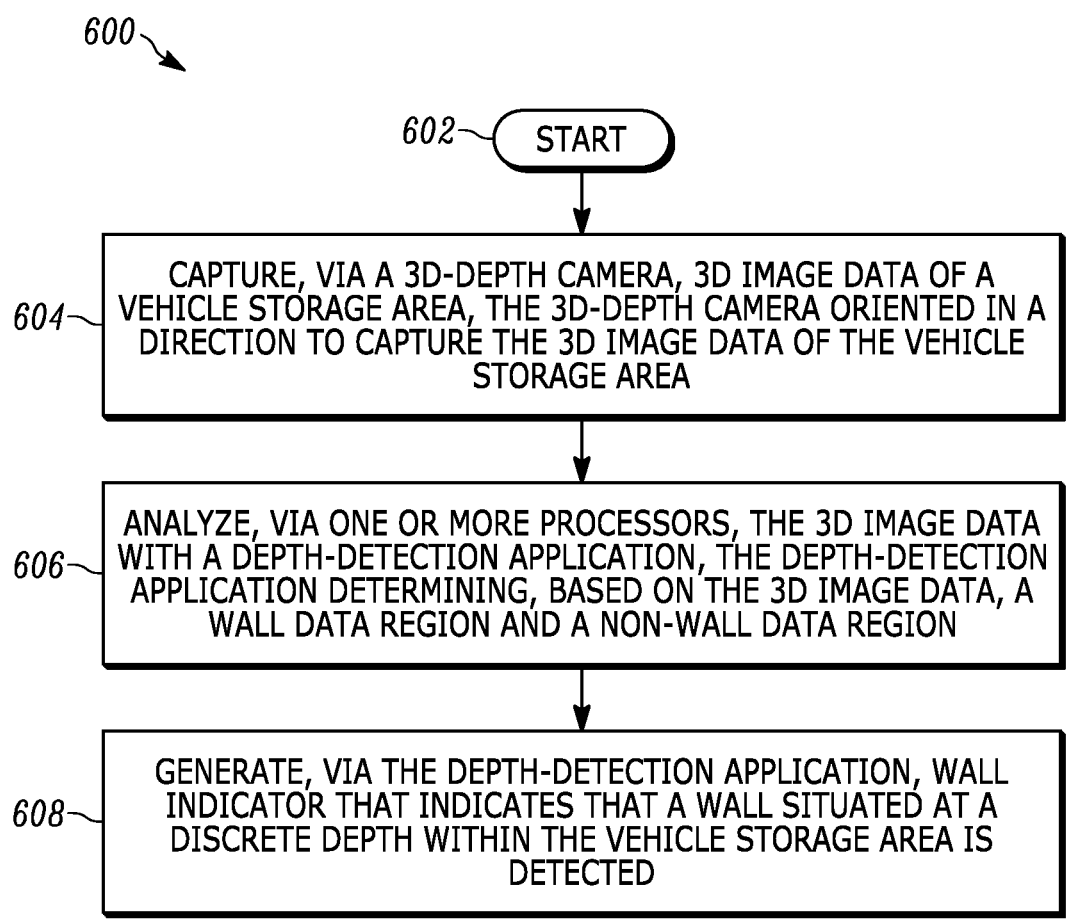
FIG. 6 is a flow chart of a depth imaging method for use in commercial trailer loading.

FIG. 6 is a flow chart of a depth imaging method 600 for use in commercial trailer loading. Method 600 begins (602) at block 604, where a 3D-depth camera (e.g., such as 3D-depth camera 254 of TMU 202) captures 3D image data of a vehicle storage area (e.g., such as vehicle storage area 102s). The 3D-depth camera is oriented in a direction to capture the 3D image data of the vehicle storage area as described herein. In some embodiments, the 3D image data may be captured periodically, for example, such as approximately every 15 seconds, approximately every 30 seconds, approximately every minute, and/or approximately every two minutes, etc., but may be captured at any time frequency provided by the related 3D-depth camera, e.g., such as provided by TMU 202.

At block 606, the 3D image data is analyzed by a depth-detection application executing on one or more processors. In some embodiments, the one or more processors may be processor(s) of the TMU 202, as described herein. In certain embodiments, the 3D-depth camera and the one or more processors may be housed in a mountable device, such as TMU 202 depicted in FIGS. 2a and 2b. In other embodiments, the one or more processors may be processors(s) (e.g., processor 302) of the server 301 as described herein. Based on the 3D image data, the depth-detection application determines a wall data region and a non-wall data region. At block 508, the depth-detection application generates a wall indicator which indicates that a wall situated at a discrete depth within the vehicle storage area is detected, and can further calculate a fullness percentage of the wall.

Figure 7A:
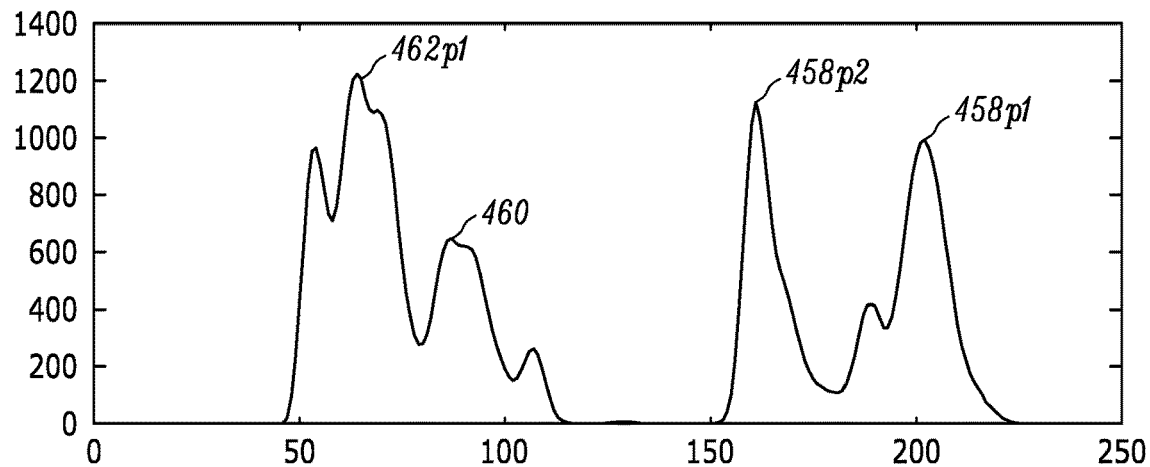
FIGS. 7A-7C are histogram renderings depicting steps for determining a dominant package wall.
Figure 7B:
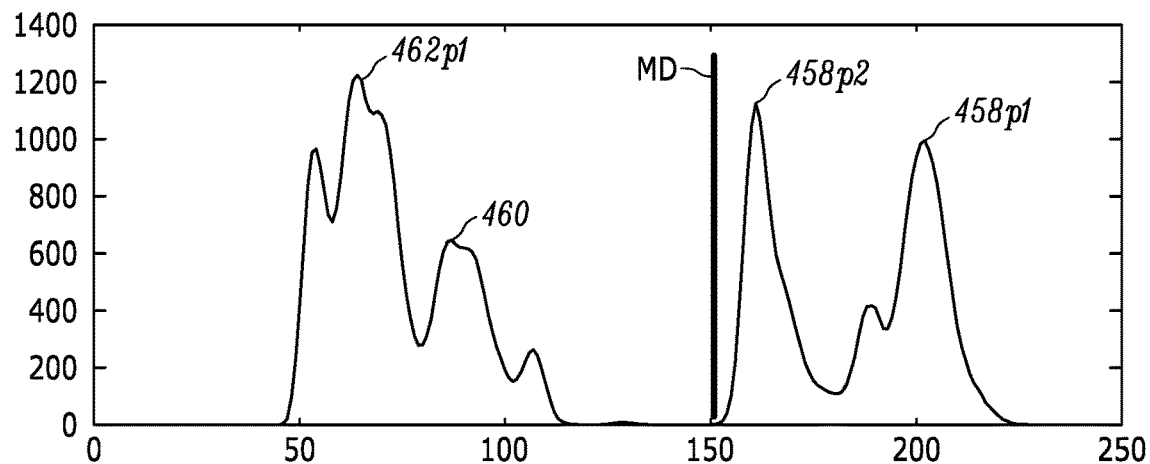
Figure 7C:
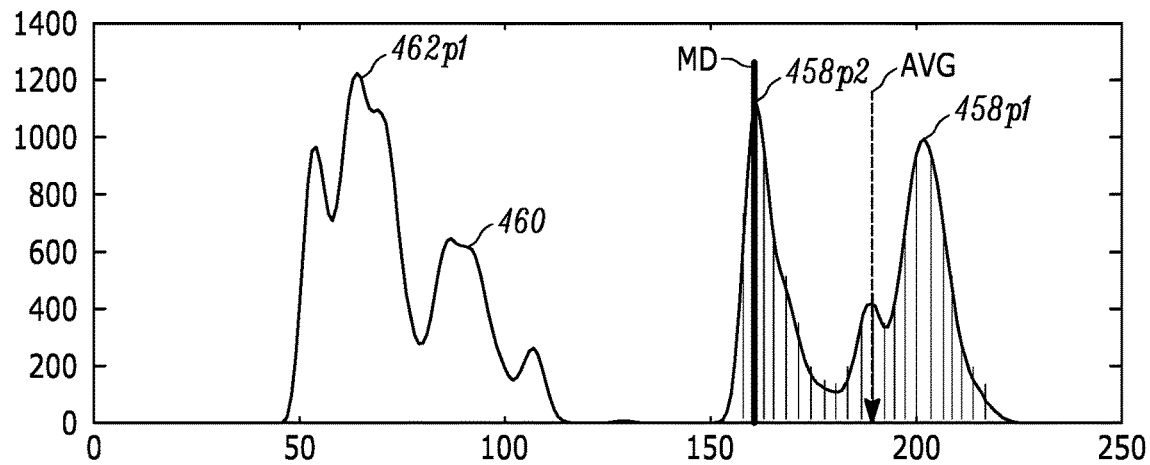

In one approach, and as illustrated in FIGS. 7A-7C, wall data regions may be determined by first calculating a histogram (e.g., histogram 452) of all of the depths located in the 3D image. Upon identifying any number of histogram peaks (e.g., 458p1, 458p2, 460, 462p1, etc. of FIGS. 7A-7C), a highest peak is identified, which, in the illustrated example, is peak 458p1. Subsequently, all peaks that are smaller than a specified threshold (e.g., all peaks that are smaller than $\frac{1}{6}^{th}$ of the maximum peak height) are filtered out and no longer considered. The remaining peaks are all potential candidates for the current wall. A furthest peak (e.g., peak 458p1) is then identified, and peaks that are positioned at a distance that is greater than a specified distance (e.g., 50", or the vertical line MD illustrated in FIGS. 7B and 7C) are also filtered out and no longer considered. Such filtered peaks may represent the loader and/or packages located on the conveyor for staging purposes. The current wall may then identified by locating a maximum of the remaining peaks (e.g., peak 458p2).

In some examples, slightly smaller peaks (e.g., peak 458p1) may be located behind the current wall and may reside within the specified threshold. In some examples, the relative proximity between peaks 458p1 and 458p2, combined with their similar height values, may result in incorrect identification of the current wall. Such peaks may represent package walls that have not yet been fully formed, meaning additional packages may be potentially disposed on top of existing packages. In order to prevent the systems and methods described herein from alternating between identifying peak 458p1 and 458p2 as the current wall, thereby adversely impacting fullness calculations, heuristics may be determined to properly identify the correct wall to be the current wall. By viewing the distance between the furthest peak and the closer peak, if the further peak is positioned within approximately 50" of the closer peak and has a height that is between approximately 50% and 99% of the height of the closer peak, the further peak may be deemed the dominant peak, and accordingly, the current wall. In some examples, the suitable value of the differences between peak heights may be chosen based on a function of the inter-peak distances. Other examples of suitable distances between walls and differences between wall heights are possible.

In some embodiments, an average wall determination is made. In some examples, the relative proximity between peaks 458$p$1 and 458$p$2, combined with their similar height values, may result in incorrect identification of the current wall. Further, the systems and methods described herein may "flip-flop" between identifying peak 458$p$1 and 458$p$2 as the current wall, which may adversely impact fullness calculations. Turning to FIG. 7C, an "average wall" determination is made whereby the entire histogram disposed behind the closest peak candidate (458$p$2) is considered, and a center of gravity is defined by averaging the histogram behind this closest peak candidate. For example, if the fullness calculation determines that peak 458$p$1 is approximately 45% full, and peak 458$p$2 is approximately 55% full, an equivalent calculation would be to state that at an average distance (e.g., at arrow AVG), the wall is completely full. As a result, fullness determinations may be quickly and more accurately made.

So configured, the described systems and methods may significantly reduce calculation times. For example, fullness calculations may be completed in between approximately 20-50 ms. Additionally, the described systems and methods may provide a more consistent and stable fullness calculation.

In some embodiments, a dashboard application executing on a client device (e.g., such as client device 204 of FIG. 2$a$), may receive the wall indicator. In certain embodiments, the wall indicator may be received by the dashboard application from the TMU device (e.g., the TMU 202). In other embodiments, the wall indicator may be received by the dashboard application from a server (e.g., server 301).

In additional embodiments, the dashboard application may include a vehicle storage area capacity value. As described herein, the vehicle storage area capacity value may indicate the filled capacity or fullness of a vehicle storage area, such as vehicle storage area 102$s$. In other embodiments, the vehicle storage area capacity value may indicate the remaining capacity or emptiness of a vehicle storage area. In still further embodiments, the dashboard application may include, or render, a vehicle storage area capacity graph. The vehicle storage area capacity graph may graphically indicate one or more vehicle storage area capacity value(s) over one or more time value(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A three-dimensional (3D) depth imaging system for use in commercial trailer loading, the 3D depth imaging system comprising:
   a 3D-depth camera configured to capture 3D image data, the 3D-depth camera oriented in a direction to capture 3D image data of an interior of a vehicle storage area; and
   a depth-detection application executing on one or more processors, the depth-detection application determining, based on the 3D image data, at least a wall data region and a non-wall data region,
   wherein the determination of the wall data region and the non-wall data region causes the depth-detection application to generate a wall indicator, the wall indicator indicating that a wall is situated at a discrete depth within the interior of the vehicle storage area, and
   wherein the determination of the wall data region and the non-wall data region comprises:
      calculating a histogram of a depths of the 3D image data;
      identifying a plurality of histogram peaks;
      identifying a highest peak from the plurality of histogram peaks and filtering the plurality of histogram peaks having a height that falls outside of a threshold percentage of the highest peak; and
      identifying a peak from the plurality of histogram peaks having a furthest distance from the 3D-depth camera and filtering the remaining plurality of histogram peaks located at a distance from the peak having the furthest distance from the 3D-depth camera.

2. The 3D depth imaging system of claim 1, wherein the 3D-depth camera and the one or more processors are housed in a mountable device.

3. The 3D depth imaging system of claim 1, wherein the wall may be any one of: a package wall or a wall of the vehicle storage area.

4. The 3D depth imaging system of claim 1, wherein the non-wall data region is associated with any one of: a loader or a staging region of the vehicle storage area.

5. The 3D depth imaging system of claim 1, wherein the non-wall data region is determined by comparing historical 3D image data to identify at least one peak region.

6. The 3D depth imaging system of claim 1, wherein the depth-detection application is configured to disregard non-wall data regions when generating the wall indicator.

7. The 3D depth imaging system of claim 1, further comprising a dashboard application, the dashboard application executing on a client device, and wherein the determination of the wall data region and the non-wall data region further causes the dashboard app to receive the wall indicator.

8. The 3D depth imaging system of claim 7, wherein the dashboard application includes a vehicle storage area capacity value, the vehicle storage area capacity value indicating a filled capacity of the vehicle storage area.

9. The 3D depth imaging system of claim 7, wherein the dashboard application includes a vehicle storage area capacity value, the vehicle storage area capacity value indicating a remaining capacity of the vehicle storage area.

10. The 3D depth imaging system of claim 1, wherein the 3D image data is 3D point cloud data.

11. The 3D depth imaging system of claim 1, wherein the 3D image data is captured periodically.

12. The 3D depth imaging system of claim 11, wherein the 3D image data is captured at any of: approximately every 15 seconds, approximately every 30 seconds, approximately every minute, or approximately every two minutes.

13. A three-dimensional (3D) depth imaging method for use in commercial trailer loading, the 3D depth imaging method comprising:
   capturing, via a 3D-depth camera, 3D image data of an interior of a vehicle storage area, the 3D-depth camera oriented in a direction to capture the 3D image data of the interior of the vehicle storage area;
   analyzing, via one or more processors, the 3D image data with a depth-detection application, the depth-detection application determining, based on the 3D image data, at least a wall data region and a non-wall data region; and
   generating, via the depth-detection application, a wall indicator, the wall indicator indicating that a wall situated at a discrete depth within the interior of the vehicle storage area is detected,
   wherein analyzing the 3D image data comprises:
      calculating a histogram of a depths of the 3D image data;
      identifying a plurality of histogram peaks;
      identifying a highest peak from the plurality of histogram peaks and filtering the plurality of histogram peaks having a height that falls outside of a threshold percentage of the highest peak; and
      identifying a peak from the plurality of histogram peaks having a furthest distance from the 3D-depth camera and filtering the remaining plurality of histogram peaks located at a distance from the peak having the furthest distance from the 3D-depth camera.

14. The 3D depth imaging method of claim 13, further comprising determining whether the peak having the furthest distance from the 3D-depth camera is the current wall.

15. The 3D depth imaging method of claim 13, wherein analyzing the 3D image data further comprises identifying a highest remaining peak from the remaining plurality of histogram peaks and generating a wall indicator.

16. The 3D depth imaging method of claim 13, further comprising calculating an average wall disposed between the wall indicator and a total depth of the vehicle storage area.

17. The 3D depth imaging method of claim 13, wherein the non-wall data region is associated with any one of: a loader or a staging region of the vehicle storage area.

18. The 3D depth imaging method of claim 13, wherein the non-wall data region is determined by comparing historical 3D image data to identify at least one peak region.

19. The 3D depth imaging method of claim 13, wherein the depth-detection application is configured to disregard non-wall data regions when generating the wall indicator.

20. The 3D depth imaging method of claim 13, further comprising receiving, via a dashboard application executing on a client device, the wall indicator.

21. The 3D depth imaging method of claim 20, wherein the dashboard application includes a vehicle storage area capacity value, the vehicle storage area capacity value indicating a filled capacity of the vehicle storage area.

22. The 3D depth imaging method of claim 13, wherein the 3D image data is captured at any of: approximately every 15 seconds, approximately every 30 seconds, approximately every minute, or approximately every two minutes.

* * * * *